US010242262B2

(12) United States Patent
Dielacher et al.

(10) Patent No.: US 10,242,262 B2
(45) Date of Patent: *Mar. 26, 2019

(54) DYNAMIC ADJUSTMENT OF IMAGING PARAMETERS

(71) Applicant: Infineon Technologies AG, Neubiberg (DE)

(72) Inventors: Markus Dielacher, Graz (AT); Josef Prainsack, Graz (AT); Martin Flatscher, Graz (AT); Michael Mark, Graz (AT); Robert Lobnik, Graz (AT)

(73) Assignee: Infineon Technologies AG, Neubiberg (DE)

(*) Notice: Subject to any disclaimer, the term of this patent is extended or adjusted under 35 U.S.C. 154(b) by 0 days.

This patent is subject to a terminal disclaimer.

(21) Appl. No.: 15/651,437

(22) Filed: Jul. 17, 2017

(65) Prior Publication Data

US 2017/0316267 A1 Nov. 2, 2017

Related U.S. Application Data

(63) Continuation of application No. 13/966,648, filed on Aug. 14, 2013, now Pat. No. 9,721,161.

(51) Int. Cl.
| | | |
|---|---|---|
| *G06K 9/00* | (2006.01) | |
| *H04N 13/254* | (2018.01) | |
| *H04N 7/18* | (2006.01) | |
| *G01S 17/93* | (2006.01) | |

(52) U.S. Cl.
CPC ..... *G06K 9/00624* (2013.01); *G06K 9/00805* (2013.01); *H04N 7/18* (2013.01); *H04N 13/254* (2018.05); *G01S 17/936* (2013.01)

(58) Field of Classification Search
CPC .......... G06K 9/00805; G06K 9/00624; H04N 13/0253; H04N 13/254; H04N 7/18
USPC ......... 348/46; 356/5.03; 382/106; 250/208.1
See application file for complete search history.

(56) References Cited

U.S. PATENT DOCUMENTS

| | | | | |
|---|---|---|---|---|
| 5,835,199 A | * | 11/1998 | Phillips | G01S 7/4802 356/5.03 |
| 9,721,161 B2 | | 8/2017 | Dielacher et al. | |
| 2004/0016870 A1 | * | 1/2004 | Pawlicki | B60K 31/0008 250/208.1 |
| 2007/0064976 A1 | * | 3/2007 | England, III | G01C 3/08 382/106 |
| 2013/0050426 A1 | * | 2/2013 | Sarmast | G01S 17/89 348/46 |
| 2013/0223689 A1 | * | 8/2013 | Saito | G06K 9/00791 382/104 |
| 2013/0293681 A1 | * | 11/2013 | Borowski | G01S 7/483 348/46 |
| 2014/0147032 A1 | * | 5/2014 | Yous | G06T 7/2033 382/154 |
| 2014/0354778 A1 | * | 12/2014 | Kolar | G06T 1/20 348/46 |
| 2015/0002808 A1 | * | 1/2015 | Rizzo, III | A61F 9/08 351/158 |

* cited by examiner

*Primary Examiner* — Paulos M Natnael
*Assistant Examiner* — Sean N. Haiem
(74) *Attorney, Agent, or Firm* — Harrity & Harrity, LLP

(57) ABSTRACT

Representative implementations of devices and techniques provide adjustable parameters for imaging devices and systems. Dynamic adjustments to one or more parameters of an imaging component may be performed based on changes to the relative velocity of the imaging component or to the proximity of an object to the imaging component.

20 Claims, 4 Drawing Sheets

DYNAMIC ADJUSTMENT OF IMAGING PARAMETERS

RELATED APPLICATION

This application is a continuation of U.S. patent application Ser. No. 13/966,648, filed Aug. 14, 2013 (now U.S. Pat. No. 9,721,161), the disclosure of which is incorporated herein by reference.

BACKGROUND

Imaging systems based on light waves are becoming more widely used for object detection as semiconductor processes have become faster to support such systems. Some imaging systems are capable of providing dozens of images per second, making such systems useful for object detection in changing environments. Due to their potentially small form factor and potentially high signal fidelity, some imaging systems are well suited for application in many types of vehicles (cars, busses, trains, aircraft, etc.). While the resolution of such imaging systems may vary, applications using these systems are able to take advantage of the speed of their operation.

A moving vehicle such as an automobile, for example, may use an imaging system to detect an object (a pedestrian, for example) in the path of the vehicle, to avoid hitting the object. For example, an imaging system may be employed on the front, rear, and/or the side(s) of the vehicle to detect objects in the forward or reverse paths of the vehicle, to the side of the vehicle, or in the blind spots of the vehicle.

However, in many cases, different imaging systems or different types of imaging systems are used for different applications (e.g., for different locations on the vehicle or for different detection functions), based on the configurations of the imaging systems. For example, a radar-based system may be used for long-range lower resolution monitoring, a 2D video system may be used for mid-range monitoring, and an ultra-sound system may be used for short-range monitoring as a parking or backing aid. In these and other cases, the systems used may be optimized for highest possible sensitivity (e.g., for longer-range uses) while sacrificing lateral and depth resolution, or optimized for best possible resolution (e.g., for shorter-range uses) while sacrificing sensitivity and operating range.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

For this discussion, the devices and systems illustrated in the figures are shown as having a multiplicity of components. Various implementations of devices and/or systems, as described herein, may include fewer components and remain within the scope of the disclosure. Alternately, other implementations of devices and/or systems may include additional components, or various combinations of the described components, and remain within the scope of the disclosure.

DETAILED DESCRIPTION

Overview

Figure 1:
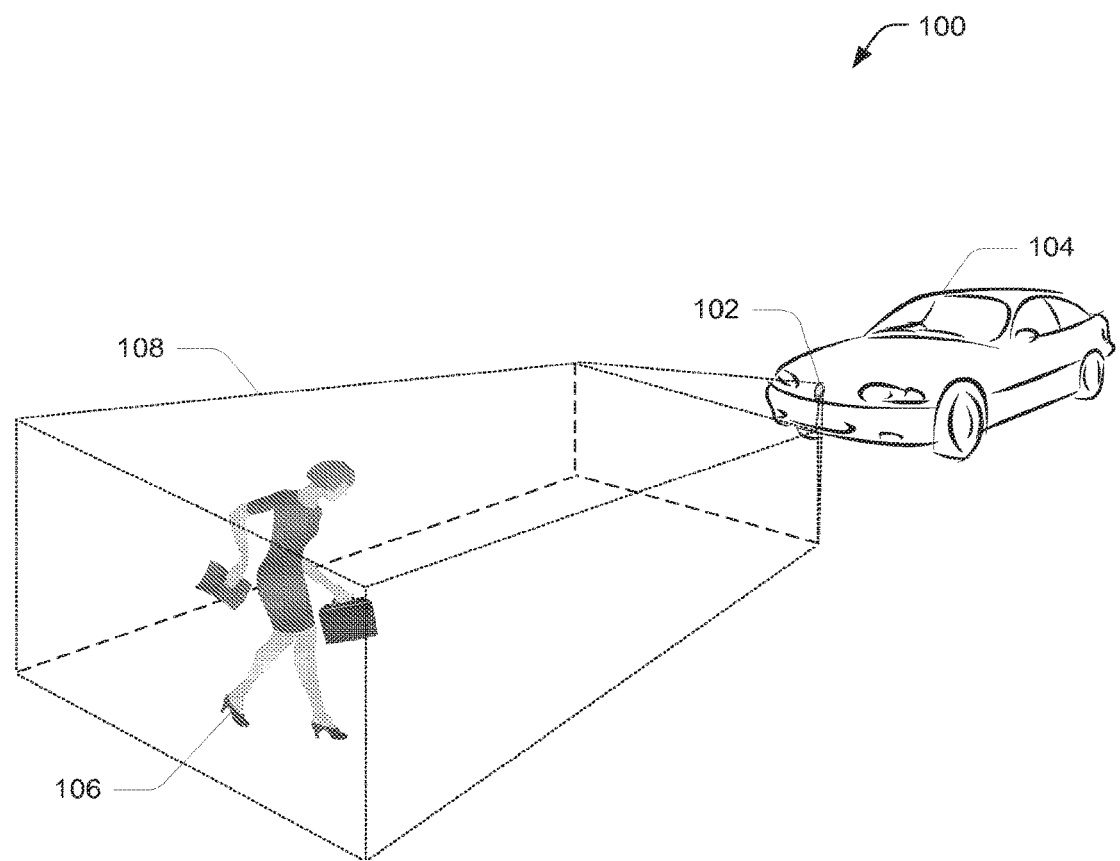
FIG. 1 is an illustration of an example application environment in which the described devices and techniques may be employed, according to an implementation.

This disclosure is related to imaging systems (imaging systems using emitted electromagnetic (EM) radiation, for example) that are arranged to detect, recognize, and/or track objects in an area relative to the imaging systems. For example, an imaging system associated with a vehicle may be used to detect an object in the path of the vehicle, or in an area near the vehicle. Additionally, the imaging system may track the object or provide an image of the object.

In various implementations, the imaging system uses distance calculations to detect, recognize, and/or track objects, or capture an image of an object in the area. In some implementations, the imaging system uses distance calculations to provide a three-dimensional image of the object or the area, using time-of-flight principles. The distance calculations may be based on receiving reflections of emitted EM radiation, as the EM radiation is reflected off objects in the area. For example, the distance calculations may be based on the speed of light and the travel time of the reflected EM radiation.

Adjustment of parameters for optimization of the imaging system may be desired at different points in time, based on the current application of the imaging system, or based on environmental factors, for example. In one instance, while the imaging system (i.e., a vehicle having the imaging system) is travelling at a relatively greater velocity or when the imaging system is being used to detect objects at a distance from the imaging system, parameters of the imaging system may be adjusted to optimize the long-range sensitivity, for example. Alternately, when the imaging system is travelling at a relatively lower velocity or being used to detect objects near to the imaging system, parameters of the imaging system may be adjusted to optimize the short-range resolution, for example.

Representative implementations of devices and techniques provide continuously adjustable parameters for imaging devices and systems. One or more parameters of an imaging device or system may be dynamically and automatically adjusted based on changes to the relative velocity of the imaging device or system or to the proximity of an object to the imaging device or system.

Various implementations and arrangements for imaging systems, devices, and techniques are discussed in this disclosure. Techniques and devices are discussed with reference to example light-based imaging systems and devices illustrated in the figures. However, this is not intended to be limiting, and is for ease of discussion and illustrative convenience. The techniques and devices discussed may be applied to any of various imaging device designs, structures, and the like (e.g., radiation based, sonic emission based, particle emission based, etc.) and remain within the scope of the disclosure.

Implementations are explained in more detail below using a plurality of examples. Although various implementations and examples are discussed here and below, further implementations and examples may be possible by combining the features and elements of individual implementations and examples.

Example Imaging System Environment

FIG. 1 is an illustration of an example application environment 100 in which the described devices and techniques may be employed, according to an implementation. As shown in the illustration, an imaging system 102 may be applied with a vehicle 104 (e.g., automobile, bus, train, aircraft, etc.), for example. In various other implementations, the imaging system 102 may be applied with other systems, devices, and the like (e.g., robotics, automation, surveillance systems, accessibility devices, safety systems, computing devices, and so forth). For convenience within this disclosure, reference to a vehicle 104 also refers to all applications employing an imaging system 102 as mentioned above, and otherwise.

In various implementations, the imaging system 102 may be integrated with the vehicle 104, or may have some components separate or remote from the vehicle 104. For example, some processing for the imaging system 102 may be located remotely (e.g., cloud, network, etc.). In another example, some outputs from the imaging system may be transmitted, displayed, or presented on a remote device or at a remote location.

The imaging system 102 may be used to detect an object 106, such as a pedestrian, for example, in a preselected area 108. In various implementations, the imaging system 102 may be arranged to detect, recognize, and/or track the movement of the object 106. In one implementation, the imaging device is arranged to output an image (e.g., a two-dimensional or three-dimensional image) of the object 106. In an example implementation, an output of the imaging system 102 may be presented or displayed on a display device, for example (e.g., a mobile computing device, a smartphone, a vehicle information system, etc.).

An example object 106 may include any item that an imaging system 102 may be arranged to detect, recognize, track, and/or the like. Such items may include a person or an animal, for example. Other examples of an object 106 may include an obstruction, a target component, another vehicle, and so forth. In various implementations, the imaging system 102 may also be arranged to detect, recognize, and/or track a gesture or configuration of the object 106. A gesture or configuration may include any movement or position of the object 106 that is expressive of an idea. For example, a gesture or configuration may include positioning an object 106 in an orientation and/or a movement of the object 106 in a pattern (e.g., in an elliptical motion, in a substantially linear motion, etc.).

The imaging system 102 may be arranged to detect, recognize, and/or track an object 106 that is within a preselected area 108 relative to the imaging system 102. A preselected area 108 may be chosen to encompass an area that objects 106 may be within, for example. In one case, the preselected area 108 may encompass an area that represents an immediate or distant forward or reverse path for the vehicle 104. This area 108 may also be to the front, side, or around the imaging system 102, for example.

The illustration of FIG. 1 shows a preselected area 108 as a polygonal-like area in front of the vehicle 104. This is for illustration and discussion purposes, and is not intended to be limiting. A preselected area 108 may be any shape or size, may be located in front, back, side(s), top, and/or bottom of the vehicle 104, and may be chosen such that it will generally encompass desired objects when they are present, but may not encompass undesired objects (e.g., other items that are not intended to be detected, recognized, tracked, or the like). In various implementations, the preselected area 108 may comprise various shapes and sizes. In some implementations, the shape and size of the preselected area 108 is dependent on the current application of the imaging device 102.

As discussed above, the techniques, components, and devices described herein with respect to an imaging system 102 are not limited to the illustration in FIG. 1, and may be applied to other imaging system and device designs and/or applications without departing from the scope of the disclosure. In some cases, additional or alternative components may be used to implement the techniques described herein. It is to be understood that an imaging system 102 may be implemented as stand-alone system or device, or as part of another system (e.g., integrated with other components, systems, etc.).

Example Imaging System

Figure 2:
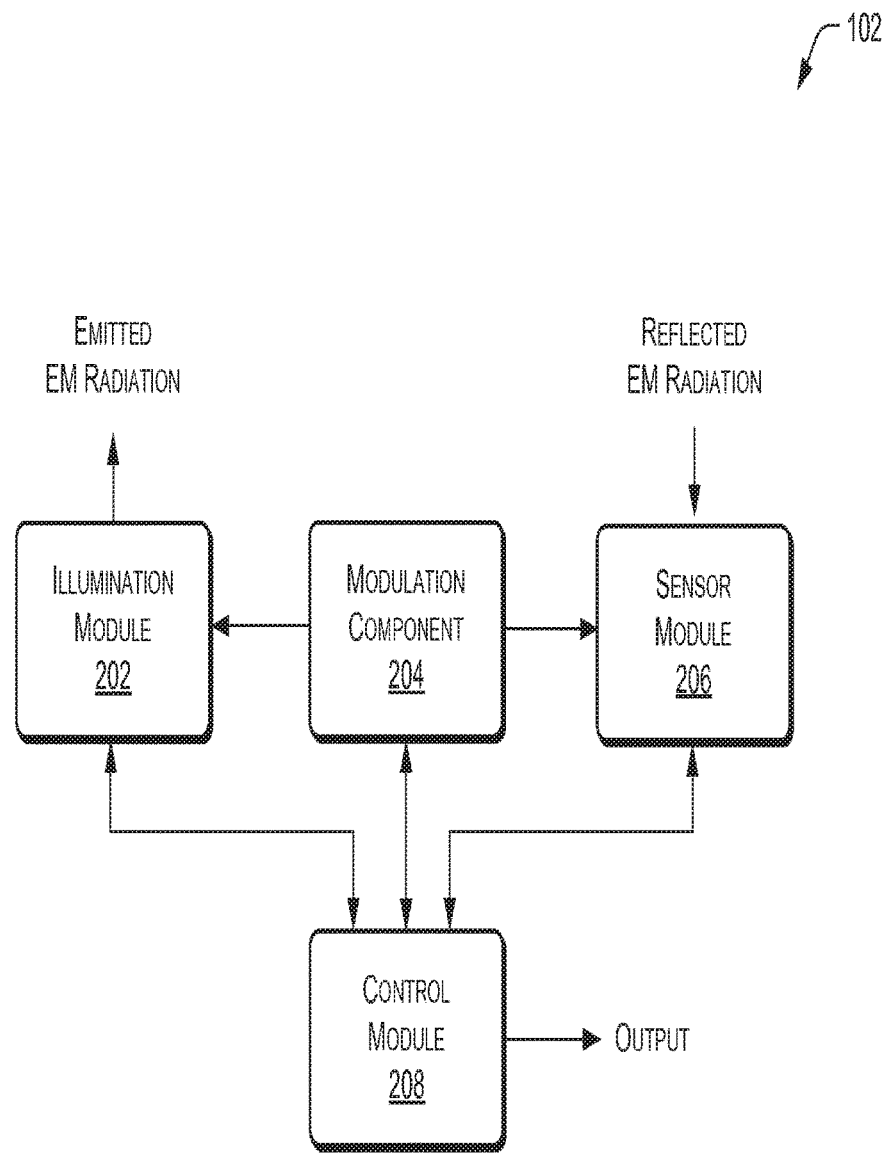
FIG. 2 is a block diagram of example imaging system components, according to an implementation.

FIG. 2 is a block diagram showing example components of an example imaging system 102, according to an implementation. As shown in FIG. 2, an imaging system 102 may include an illumination module 202, a modulation component 204, a sensor module 206, and a control module 208. In various implementations, an imaging system 102 may include fewer, additional, or alternate components, and remain within the scope of the disclosure. One or more components of an imaging system 102 may be collocated, combined, or otherwise integrated with another component of the imaging system 102. For example, in one implementation, the imaging system 102 may comprise an imaging device or apparatus. Further, one or more components of the imaging system 102 may be remotely located from the other(s) of the components.

If included in an implementation, the illumination module 202 is arranged to emit electromagnetic (EM) radiation (e.g., light radiation) to illuminate the preselected area 108. In various implementations, the illumination module 202 includes an illumination source such as a light emitter, for example. In one implementation, the illumination source comprises a light-emitting diode (LED). In another implementation, the illumination source comprises a laser emitter. In one implementation, the illumination module 202 illuminates the entire environment (e.g., the preselected area 108) with each light pulse emitted. In an alternate implementation, the illumination module 202 illuminates the environment in stages or scans.

In various implementations, different forms of EM radiation may be emitted from the illumination module 202. In one implementation, infrared light is emitted. For example, the light radiation may comprise one or more modulated infrared light pulses. The illumination module 202 may be switched on for a short interval, allowing the emitted light pulse to illuminate the preselected area 108, including any objects 106 within the preselected area 108. Infrared light provides illumination to the preselected area 108 that is not visible to the human eye, and so is not distracting. In other implementations, other types or frequencies of EM radiation may be emitted that provide visual feedback or the like. As mentioned above, in alternate implementations, other energy forms (e.g., radiation based, sonic emission based, particle emission based, etc.) may be emitted by the illumination module 202.

In an implementation, the illumination module 202 is arranged to illuminate one or more objects 106 that may be present in the preselected area 108, to detect the objects 106. In one implementation, a parameter or characteristic (an illumination time (i.e., duration) of the light radiation, for example) of the illumination source (e.g., LED, laser, etc.) of the illumination module 202 is arranged to be automatically, dynamically, and/or selectively adjusted based on the relative velocity of the sensor module 206 (i.e., a vehicle 104 having the sensor module 206, for example) or the proximity of an object to the sensor module 206 (or to the vehicle 104).

For example, to conserve power, the illumination time of the illumination source of the illumination module 202 may be decreased when the relative velocity of the sensor module 206 (i.e., the vehicle 104) is less than a threshold value (e.g., 20 kmph, etc.) or when an object 106 is within a threshold proximity (e.g., 2 meters, etc.) to the sensor module 206. Under these conditions, the sensor module 206 may be capable of capturing a usable image with less illumination or with a shorter illumination/imaging time. Alternately, the illumination time of the illumination source may be increased when the relative velocity of the sensor module 206 (i.e., the vehicle 104) is less than the threshold value. For instance, increased illumination time may be desirable to capture an image with fine detail, or the like.

In another example, the illumination time may be increased when the relative velocity of the sensor module 206 (i.e., the vehicle 104) is greater than the threshold value (or greater than another threshold value) or when the object 106 is outside the threshold proximity (or outside another threshold proximity) to the sensor module 206. Under such conditions, a greater illumination time may be used to capture a usable image or to increase the range of the imaging system 102, for example. Alternately, the illumination time may be decreased when the relative velocity of the sensor module 206 (i.e., the vehicle 104) is greater than the threshold value (or greater than another threshold value) when less illumination is sufficient for the desired imaging application, for instance.

In alternate implementations, an illumination time, a duty cycle, a peak power, and/or a modulation frequency of the EM radiation may be adjusted based on the relative velocity of the imaging system 102 (i.e., a vehicle 104 having the imaging system 102, for example) or the proximity of an object to the imaging system 102 (or to the vehicle 104).

If included in an implementation, the modulation component 204 may be arranged to modulate the EM radiation emitted from the illumination module 202 and/or to modulate one or more components (e.g., photosensitive pixels 302) of the sensor module 206. In various implementations, the modulation component 204 may be arranged to correlate the modulation of the EM radiation with the modulation of the components of the sensor module 206 during time-of-flight operation (e.g., to calculate a distance of an object 106 from the imaging system 102 or to form a two-dimensional or three-dimensional image of the object 106, for example).

In an implementation, the frequency of modulation of the modulation component 206 is adjustable based on the relative velocity of the imaging system 102 or the proximity of an object 106 to the imaging system 102. For example, in an implementation, the modulation frequency is increased when the relative velocity of the imaging system 102 is below a threshold value or when the object 106 is within a threshold proximity to the imaging system 102, and the modulation frequency is reduced when a relative velocity of the imaging system 102 is above a threshold value or when the object 106 is at a distance greater than the threshold proximity to the imaging system 102.

In various implementations, the sensitivity and/or resolution of the imaging system 102 is adjusted by adjusting the modulation frequency. For example, increasing the modulation frequency can improve the depth resolution (e.g., higher resolution and finer detail) of the imaging system 102, and decreasing the modulation frequency can improve the range or sensitivity of the imaging system 102. In various implementations, the adjustment to the modulation frequency may apply to modulation of the illumination and/or modulation of the pixels 302 of the sensor module 206.

Figure 3:
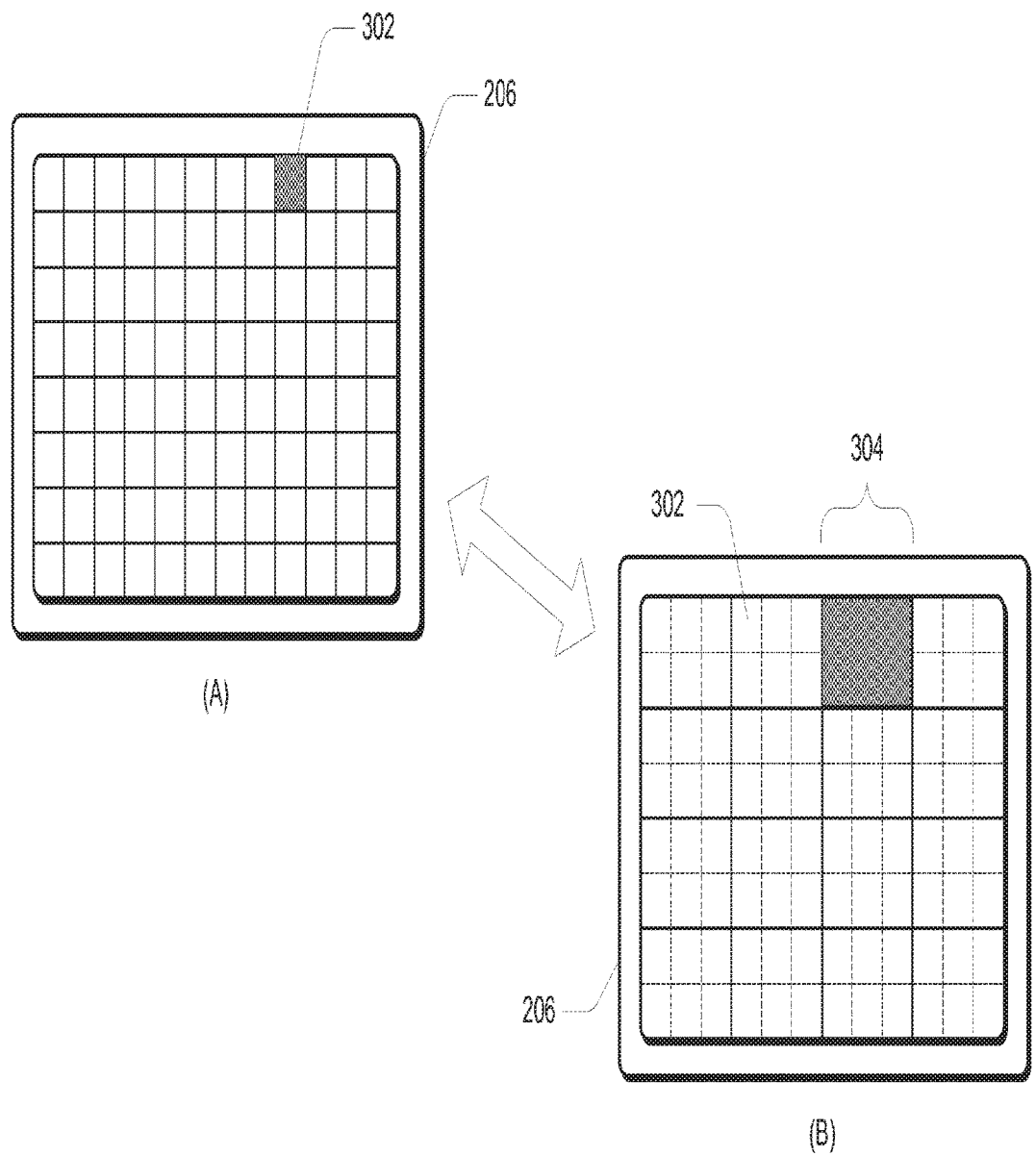
FIG. 3 is a block diagram of an example sensor device, illustrating a binning technique, according to an implementation.

In various implementations, as shown in FIGS. 2 and 3, a sensor module 206 is included in an imaging system 102, and comprises an imaging sensor arranged to receive reflected light radiation from an object 106 in the predetermined area 108. For example, the sensor module 206 may be arranged to capture an image (e.g., two-dimensional image or three-dimensional image) of the area 108 or of the object 106 within the area 108 based on receiving the reflection of the light radiation.

In an implementation, the sensor module 206 is an adjustable imaging sensor, where at least one of the modulation frequency or a binning of pixels 302 of the adjustable imaging sensor is arranged to be adjusted based on the relative velocity of the adjustable imaging sensor (i.e., a vehicle 104 having the sensor module 206, for example) or the proximity of the object 106 to the adjustable imaging sensor. In an example, the sensor module 206 (i.e., the adjustable imaging sense) is arranged to be continuously (e.g., automatically, dynamically, constantly, etc.) adjusted based on changes to the relative velocity of the adjustable imaging sensor or to the proximity of the object 106 to the adjustable imaging sensor.

In an implementation, the sensor module 206 provides a measure of the time for light radiation to travel from the illumination module 202, to the object 106, and back to the sensor module 206. Accordingly, in such an implementation, the imaging system 102 comprises a three-dimensional range imaging device based on time-of-flight principles.

For example, in one implementation, the sensor module 206 is an image sensor arranged to detect an object 106 within the preselected area 108 based on receiving the reflected light radiation. The sensor module 206 can detect whether an object 106 is in the preselected area 108 based on the time that it takes for the light radiation emitted from the illumination module 202 to be reflected back to the sensor module 206. This can be compared to the time that it takes for the EM radiation to return to the sensor module 206 when no object is in the preselected area 108.

In one implementation, the sensor module 206 is arranged to determine a distance of a detected object 106 from the imaging system 102, based on receiving the reflected EM radiation. For example, the sensor module 206 can determine the distance of a detected object 106 by multiplying the speed of light by the time taken for the EM radiation to travel from the illumination module 202, to the object 106, and back to the sensor module 206.

In some implementations, as shown in FIG. 3, the sensor module 206 may be comprised of multiple photosensitive pixels 302. In one example, each of the multiple pixels 302 is an individual image sensor. In such an example, a resulting image from the sensor module 206 may be a combination of the sensor images of the individual pixels 302, or of groups of pixels 304. In an implementation, each of the plurality of photosensitive pixels 302 or groups of pixels 304 are arranged to convert the reflection of the light radiation into an electrical current signal. In various implementations, the current signals from the pixels 302 or groups 304 may be processed into an image by one or more processing components (e.g., the control module 208).

In one implementation, each pixel 302 or group of pixels 304 of the sensor module 206 is arranged to measure the time for a portion of the EM radiation to travel from the illumination module 202, to the object 106, and back to the pixel 302 or group 304.

In various implementations, the lateral resolution and/or the sensitivity of the sensor module 206 is adjustable based on the relative velocity of the imaging system 102 (i.e., a vehicle 104 having the imaging system 102, for example) or the proximity of an object 106 to the imaging system 102 (or to the vehicle 104). In an example, the lateral resolution of the sensor module 206 (i.e., the adjustable imaging sensor) is arranged to decrease and/or the sensitivity is arranged to increase as the relative velocity of the adjustable imaging sensor increases or as the distance of the object 106 from the adjustable imaging sensor increases. Additionally, the lateral resolution of the adjustable imaging sensor is arranged to increase and/or the sensitivity is arranged to decrease as the relative velocity of the adjustable imaging sensor decreases or as the distance of the object 106 from the adjustable imaging sensor decreases.

In an implementation, as shown in FIG. 3, the lateral resolution and/or the sensitivity of the sensor module 206 (i.e., the adjustable imaging sensor) is adjusted with a pixel binning technique. For example, in the implementation, one or more quantities of the multiple pixels 302 of the sensor module 206 are grouped and processed as "composite pixels" (a.k.a., "groups") 304 based on the relative velocity of the imaging system 102 or the proximity of the object 106 to the imaging system 102. Increased "pixel" area due to binning pixels 302 into larger groups 304 of pixels 302 may result in higher sensor-sensitivity, improving the range of the imaging system 102. Increased "pixel" quantity due to binning pixels 302 into smaller groups 304 (including refraining from binning the pixels 302) may result in higher lateral resolution.

In the example shown in FIG. 3 at (A), the sensor module 206 is comprised of a 12×8 array of pixels 302. In this configuration, the 12×8 array provides increased lateral resolution for close-range imaging, for example. In the example shown in FIG. 3 at (B), the sensor module 206 is comprised of a 4×4 array of groups 304, with each group 304 comprising a 3×2 binned group of pixels 302. Each 3×2 array group 304 is processed as a single composite pixel. In this configuration, the 4×4 array provides increased sensitivity for long-range imaging, for example, since each group 304 has a larger area for receiving EM radiation.

In alternate implementations, the sensor module 206 may be comprised of any number of pixels 302. In various implementations, the pixels 302 may be binned into any group 304 size desired, based on the performance desired, for a given relative velocity or object 106 proximity. Further, the pixels 302 may be dynamically or continuously binned in different arrangements of groups 304 having differing numbers of pixels 302 each, as the relative velocity of the imaging system 102 (i.e., a vehicle 104 having the imaging system 102, for example) changes or the proximity of an object 106 to the imaging system 102 (or to the vehicle 104) changes.

In various implementations, as shown in FIG. 2, the imaging system 102 includes a control module 208 arranged to provide controls and/or processing to the imaging system 102. For example, the control module 208 may control the operation of the other modules (202, 204, 206), and/or process the signals and information output by the other modules (202, 204, 206). In various implementations, the control module 208 is arranged to communicate with one or more of the illumination module 202, modulation component 204, and sensor module 206. In some implementations, the control module 208 may be integrated into one or snore of the other modules (202, 204, 206), or be remote to the modules (202, 204, 206).

In an implementation, the control module 208 is arranged to adjust one or more parameters of the sensor module 206 based on a relative velocity of the imaging system 102 with respect to an environment of the imaging system 102 or based on the proximity of an object 106 to the imaging system 102. For example, the control module 208 may be arranged to determine the illumination time of the illumination module 202, the modulation frequency of the modulation component 204, the binning of the pixels 302 of the sensor module 206, the threshold values and proximity values used by each of the modules (202, 204, 206), and the like.

In some implementations, as shown in FIG. 2, the control module 208 is arranged to output distance information and/or an image (e.g., a two-dimensional or three-dimensional image) of one or more elements (e.g., object(s) 106, environmental elements, roadways, etc.) of the area 108, based on time-of-flight principles.

In one implementation, the control module 208 includes one or more detection components arranged to detect the relative velocity of the imaging sensor (i.e., a vehicle 104 having the imaging system 102, for example) with respect to an environment of the imaging sensor or detect a proximity of an object to the aging sensor (or to the vehicle 104). In one example, the control module 208 includes one or more detection components, such as circuits, systems, processors, memory, and the like, that use the imaging information from the sensor module 206 to determine the relative velocity and the proximity of object(s) to the vehicle 104. In alternate implementations, the control module 208 uses other information (e.g., global positioning satellite (GPS), other satellite-based information, cellular data, etc.) to determine the relative velocity and the proximity of object(s) to the vehicle 104. In other implementations, the detection of the relative velocity and the proximity of object(s) to the vehicle 104 is performed separate from the control module 208, by a separate sensor system or the like.

In an implementation, the control module 208 is arranged to detect, recognize, and/or track objects 106, based on the imaging information output by the sensor module 206. In various implementations, the control module 208 may be programmed to recognize some objects 106 and exclude others.

In one implementation, the control module 208 includes one or more processing components (e.g., processor, digital logic, controller, etc.) and associated memory storage (integrated or separate hardware from the processing component). For example, in an implementation, the control module 208 is arranged to calculate a distance of the object 106 from the imaging system 102, based on the measured time of the reflected EM radiation. Accordingly, the control module 208 may be arranged to convert the current signal output from the sensor module 206 (or from the pixels of the sensor module 206) to a distance of the object 106 from the imaging system 102. Further, in an implementation, the control module 208 may be arranged to convert the current signal to a three-dimensional image of the object 106. In one implementation, the control module 208 is arranged to output the calculated distance and/or the three-dimensional image of the object 106. For example, the imaging system 102 may be arranged to output a distance, a three-dimensional image of the detected object 106, tracking coordinates of the object 106, and so forth, to a display device, to another system arranged to process the information, or the like.

In various implementations, additional or alternative components may be used to accomplish the disclosed techniques and arrangements.

Representative Process

Figure 4:
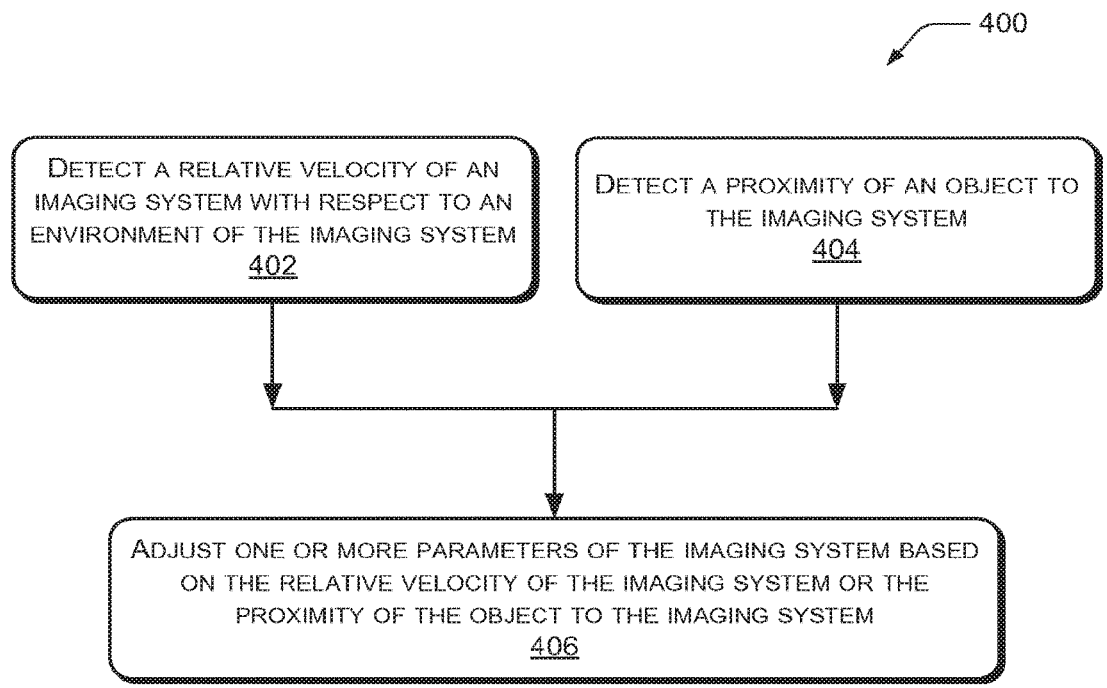
FIG. 4 is a flow diagram illustrating an example process for adjusting parameters of an imaging system, according to an implementation.

FIG. 4 illustrates a representative process 400 for adjusting parameters of an imaging system (such as imaging system 102). One or more parameters of the imaging system may be adjusted based on the relative velocity of the imaging system (i.e., a vehicle having the imaging system, for example) or the proximity of an object to the imaging system. The process 400 is described with reference to FIGS. 1-3.

The order in which the process is described is not intended to be construed as a limitation, and any number of the described process blocks can be combined in any order to implement the process, or alternate processes. Additionally, individual blocks may be deleted from the process without departing from the spirit and scope of the subject matter described herein. Furthermore, the process can be implemented in any suitable materials, or combinations thereof, without departing from the scope of the subject matter described herein.

At block 402, the process includes detecting the relative velocity of an imaging system (such as imaging system 102, for example, or a vehicle having the imaging system) with respect to an environment of the imaging system. In various implementations, the relative velocity of the imaging system may refer to the actual velocity of the imaging system (or associated vehicle), the velocity of the environment or of an element of the environment of the imaging system (such as another vehicle approaching the imaging system, for example), a combined or relative velocity that includes (i.e., combines) the velocity of the imaging system (or associated vehicle) and the velocity of the environment or of an element of the environment of the imaging system, and the like.

At block 404, the process concurrently includes detecting the proximity of an object to the imaging system. For example, the imaging system may be coupled to a vehicle such as an automobile, bus, train, aircraft, etc., and may be arranged to capture an image of an area (such as area 108, for example) or of an object (such as object 106, for example) within the area.

At block 406, the process includes adjusting one or more parameters of the imaging system based on the relative velocity of the imaging system or the proximity of the object to the imaging system. For example, in one implementation, the process includes adjusting a sensitivity and/or a resolution of the imaging system based on the relative velocity of the imaging system or the proximity of the object to the imaging system. In another implementation, the process includes adjusting an illumination time of an illumination source of the imaging system based on the relative velocity of the imaging system or the proximity of the object to the imaging system. In various implementations, the one or more parameters of the imaging system may include a range (in distance), a lateral resolution (in number of pixels), a depth resolution (in length, for example), an illumination time, a frame rate (in frames per second, for example), and the like.

In an implementation, the process includes adjusting the one or more parameters to increase a detection range of the imaging system based on detecting the relative velocity of the imaging system above a threshold value or detecting the object at a distance greater than a threshold proximity to the imaging system. In various implementations, the threshold value and/or the threshold proximity may be stored values (e.g., in a local or remote memory storage device, for example) accessible to the imaging system. In other implementations, the threshold value and/or the threshold proximity may be calculated (by the control module, for example), based on the application of the imaging system or the current environmental conditions.

In an implementation, the process includes adjusting the one or more parameters to increase the lateral resolution of the imaging system based on detecting a relative velocity of the imaging system below the threshold value or detecting the object at a distance within the threshold proximity to the imaging system. For example, the process may include adjusting a modulation frequency of one or more pixels of the imaging system and/or of an illumination source of the imaging system to improve the lateral resolution, based on the relative velocity of the imaging system or the proximity of the object to the imaging system. In one implementation, the adjusting includes increasing the modulation frequency of the imaging system when a relative velocity of the imaging system is below a threshold value or when the object is within a threshold proximity to the imaging system, and reducing the modulation frequency of the imaging system when a relative velocity of the imaging system is above a threshold value (or another threshold value) or when the object is at a distance greater than the threshold proximity (or another threshold proximity) to the imaging system.

Additionally or alternately, adjusting the one or more parameters to increase the lateral resolution of the imaging system may include adjusting the binning of pixels (such as pixels 302, for example) of the imaging system (e.g., the imaging sensor, the sensor module, etc.) based on the relative velocity of the imaging system or the proximity of the object to the imaging system. In the implementation, the binning comprises combining one or more quantities of adjacent pixels into groups (such as groups 304, for example) and processing the groups as single composite pixels.

For example, the process may include reducing the quantity of pixels combined into a group or discontinuing binning the pixels when the relative velocity of the imaging system is below the threshold value or when the object is within the threshold proximity to the imaging system, and increasing the quantity of pixels combined into the group when the relative velocity of the imaging system is greater than the threshold value (or another threshold value) or when the object is a distance greater than the threshold proximity (or another threshold proximity) to the imaging system.

In various implementations, adjusting the one or more parameters to adjust sensitivity, detection range, or lateral resolution, includes adjusting the illumination time of the illumination source of the imaging system based on the relative velocity of the imaging system or the proximity of the object to the imaging system. For example, in an implementation, the process includes increasing the illumination time of the illumination source when the object is at a distance greater than the threshold proximity to the imaging system, and reducing the illumination time of the illumination source when the object is at a distance within the threshold proximity (or another threshold proximity) to the imaging system.

Additionally or alternatively, the process may include increasing or decreasing the illumination time of the illumination source based on changes to the relative velocity of the imaging system (or the vehicle) with respect to one or more threshold values.

In various implementations, the process includes capturing a three-dimensional image of the area using the one or more adjusted parameters. For example, in an implementation, the process includes emitting electromagnetic (EM) radiation (at an illumination module 202, for example) based on the one or more adjusted parameters to illuminate a preselected area and receiving reflected EM radiation at an imaging sensor (such as sensor module 206, for example) based on the adjusted parameters to capture the image of the area. In various implementations, the process may include detecting, recognizing, and/or tracking an object.

In some implementations, the process may include measuring a time from emitting the EM radiation to receiving the reflection of the EM radiation and calculating a distance of an object based on the measured time. In a further implementation, the process includes outputting imaging information, such as a distance, a three-dimensional image of the detected object, tracking coordinates of the object, and so forth, to a display device, to another system arranged to process the information, or the like.

In alternate implementations, other techniques may be included in the process 400 in various combinations, and remain within the scope of the disclosure.

Conclusion

Although the implementations of the disclosure have beers described in language specific to structural features and/or methodological acts, it is to be understood that the implementations are not necessarily limited to the specific features or acts described. Rather, the specific features and acts are disclosed as representative forms of implementing example devices and techniques.

What is claimed is:

1. An apparatus, comprising:
   a detection component to:
   detect a relative velocity of an adjustable imaging sensor with respect to an environment of the adjustable imaging sensor, or detect a proximity of an object to the adjustable imaging sensor; and
   the adjustable imaging sensor to:
   determine whether the relative velocity satisfies at least one of a first relative velocity threshold or a second relative velocity threshold, or whether the proximity of the object satisfies at least one of a first proximity threshold or a second proximity threshold;
   identify a current imaging application,
   the current imaging application being one of:
   a short-range imaging application,
   a mid-range imaging application, or
   a long-range imaging application; and
   adjust a parameter of the adjustable imaging sensor based on the current imaging application and based on:
   whether the relative velocity satisfies at least one of the first relative velocity threshold or the second relative velocity threshold, or
   whether the proximity satisfies at least one of the first proximity threshold or the second proximity threshold,
   the parameter that is adjusted including at least one of:
   a modulation frequency of one or more pixels or of an illumination source,
   a binning of pixels that combine quantities of adjacent pixels into groups for processing as single composite pixels, or
   an illumination time of the illumination source, and
   the parameter being adjusted to:
   optimize the long-range imaging application based on the relative velocity satisfying the first relative velocity threshold or the proximity satisfying the first proximity threshold,
   optimize the mid-range imaging application based on the relative velocity satisfying the second relative velocity threshold and not satisfying the first relative velocity threshold or the proximity satisfying the second proximity threshold and not satisfying the first proximity threshold, or
   optimize the short-range imaging application based on the relative velocity not satisfying the second relative velocity threshold or the proximity not satisfying the second proximity threshold.

2. The apparatus of claim 1, where the adjustable image sensor is further to:
   access information indicating at least one of the first relative velocity threshold, the second relative velocity threshold, the first proximity threshold, or the second proximity threshold that is stored in a memory.

3. The apparatus of claim 1, further comprising the illumination source to illuminate an image area.

4. The apparatus of claim 1, where the parameter that is adjusted is the illumination time of the illumination source that is configured to be increased when the proximity satisfies the first proximity threshold, and is configured to be decreased when the proximity does not satisfy the second proximity threshold.

5. The apparatus of claim 1, where the adjustable imaging sensor is configured to be readjusted based on a change to whether the relative velocity satisfies at least one of the first relative velocity threshold or the second relative velocity threshold, or a change to whether the proximity satisfies at least one of the first proximity threshold or the second proximity threshold.

6. The apparatus of claim 1, where parameter that is adjusted is the modulation frequency of one or more pixels that is configured to be increased when the proximity does not satisfy the second proximity threshold, and is configured to be decreased when the proximity satisfies the first proximity threshold.

7. The apparatus of claim 1, where the parameter that is adjusted is the modulation frequency of the illumination source that is configured to be increased when the proximity does not satisfy the second proximity threshold, and is configured to be decreased when the proximity satisfies the first proximity threshold.

8. The apparatus of claim 1, where the parameter that is adjusted is the binning of pixels that is configured to reduce the quantities of adjacent pixels combined into groups when the proximity does not satisfy the second proximity threshold, and is configured to increase the quantities of adjacent pixels combined into groups when the proximity satisfies the first proximity threshold.

9. A system, comprising:
   a sensor configured to capture an image of an area based on receiving a reflection of light radiation; and
   a controller configured to:
   detect a relative velocity of the sensor with respect to an environment of the sensor, or detect a proximity of an object to the sensor;
   determine whether the relative velocity satisfies at least one of a first relative velocity threshold or a second relative velocity threshold, or whether the proximity of the object satisfies at least one of a first proximity
threshold or a second proximity threshold;
identify a current imaging application,
the current imaging application being one of:
a short-range imaging application,
a mid-range imaging application, or
a long-range imaging application;
adjust a parameter of the sensor based on the current
imaging application and based on:
whether the relative velocity satisfies at least one of
the first relative velocity threshold or the second
relative velocity threshold, or
whether the proximity satisfies at least one of the first
proximity threshold or the second proximity
threshold,
the parameter that is adjusted including at least one
of:
a modulation frequency of one or more pixels or
of an illumination source,
a binning of pixels that combine quantities of
adjacent pixels into groups for processing as
single composite pixels, or
an illumination time of the illumination source,
and
the parameter being adjusted to:
optimize the long-range imaging application
based on the relative velocity satisfying the first
relative velocity threshold or the proximity satisfying the first proximity threshold,
optimize the mid-range imaging application based
on the relative velocity satisfying the second
relative velocity threshold and not satisfying the
first relative velocity threshold or the proximity
satisfying the second proximity threshold and
not satisfying the first proximity threshold, or
optimize the short-range imaging application
based on the relative velocity not satisfying the
second relative velocity threshold or the proximity not satisfying the second proximity
threshold; and
capture the image using the sensor with the adjusted
parameter.

10. The system of claim 9, where the controller is further configured to:
access information indicating at least one of the first relative velocity threshold, the second relative velocity threshold, the first proximity threshold, or the second proximity threshold that is stored in a memory.

11. The system of claim 9, where the parameter that is adjusted is the illumination time of the illumination source that is configured to be increased when the proximity satisfies the first proximity threshold, and is configured to be decreased when the proximity does not satisfy the second proximity threshold.

12. The system of claim 9, where the sensor is configured to be readjusted based on a change to whether the relative velocity satisfies at least one of the first relative velocity threshold or the second relative velocity threshold, or a change to whether the proximity satisfies at least one of the first proximity threshold or the second proximity threshold.

13. The system of claim 9, where parameter that is adjusted is the modulation frequency of one or more pixels that is configured to be increased when the proximity does not satisfy the second proximity threshold, and is configured to be decreased when the proximity satisfies the first proximity threshold.

14. The system of claim 9, where the parameter that is adjusted is the modulation frequency of the illumination source that is configured to be increased when the proximity does not satisfy the second proximity threshold, and is configured to be decreased when the proximity satisfies the first proximity threshold.

15. The system of claim 9, where the parameter that is adjusted is the binning of pixels that is configured to reduce the quantities of adjacent pixels combined into groups when the proximity does not satisfy the second proximity threshold, and is configured to increase the quantities of adjacent pixels combined into groups when the proximity satisfies the first proximity threshold.

16. A method, comprising:
detecting, by an imaging device, a relative velocity of an adjustable imaging sensor with respect to an environment of the adjustable imaging sensor, or detecting a proximity of an object to the adjustable imaging sensor;
determining, by the imaging device, whether the relative velocity satisfies at least one of a first relative velocity threshold or a second relative velocity threshold, or whether the proximity of the object satisfies at least one of a first proximity threshold or a second proximity threshold;
identifying, by the imaging device, a current imaging application,
the current imaging application being one of:
a short-range imaging application,
a mid-range imaging application, or
a long-range imaging application;
adjusting, by the imaging device, a parameter of the adjustable imaging sensor based on the current imaging application and based on:
whether the relative velocity satisfies at least one of the first relative velocity threshold or the second relative velocity threshold, or
whether the proximity satisfies at least one of the first proximity threshold or the second proximity threshold,
the parameter that is adjusted including at least one of:
a modulation frequency of one or more pixels or of an illumination source,
a binning of pixels that combine quantities of adjacent pixels into groups for processing as single composite pixels, or
an illumination time of the illumination source, and
the parameter being adjusted to:
optimize the long-range imaging application based on the relative velocity satisfying the first relative velocity threshold or the proximity satisfying the first proximity threshold,
optimize the mid-range imaging application based on the relative velocity satisfying the second relative velocity threshold and not satisfying the first relative velocity threshold or the proximity satisfying the second proximity threshold and not satisfying the first proximity threshold, or
optimize the short-range imaging application based on the relative velocity not satisfying the second relative velocity threshold or the proximity not satisfying the second proximity threshold; and
capturing, by the imaging device, an image using the adjustable imaging sensor with the adjusted parameter.

17. The method of claim 16, further comprising:
accessing information indicating at least one of the first relative velocity threshold, the second relative velocity threshold, the first proximity threshold, or the second proximity threshold that is stored in a memory.

18. The method of claim 16, where the parameter that is adjusted is the illumination time of the illumination source that is configured to be increased when the proximity satisfies the first proximity threshold, and is configured to be decreased when the proximity does not satisfy the second proximity threshold.

19. The method of claim 16, where the adjustable imaging sensor is configured to be readjusted based on a change to whether the relative velocity satisfies at least one of the first relative velocity threshold or the second relative velocity threshold, or a change to whether the proximity satisfies at least one of the first proximity threshold or the second proximity threshold.

20. The method of claim 16, further comprising:
illuminating, via the illumination source, an image area.

\* \* \* \* \*